Dec. 9, 1952  C. H. WINTER, JR  2,621,121
PRODUCTION OF TITANIUM METAL
Filed Sept. 27, 1949
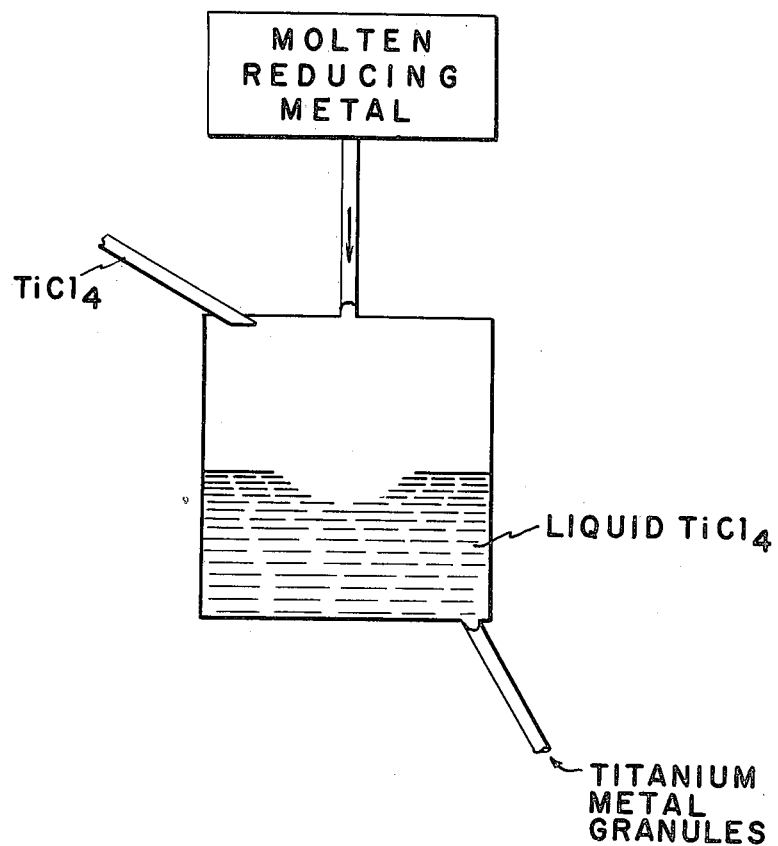
INVENTOR
Charles H. Winter, Jr.
BY
ATTORNEY Patented Dec. 9, 1952

2,621,121

UNITED STATES PATENT OFFICE 2,621,121

PRODUCTION OF TITANIUM METAL

Charles H. Winter, Jr., Wilmington, Del., assignor to E. I. du Pont de Nemours and Company, Wilmington, Del., a corporation of Delaware Application September 27, 1949, Serial No. 118,201

9 Claims. (Cl. 75—84)

This invention relates to the preparation of titanium metal. More particularly, it concerns the production of pure titanium metal by reduction of a titanium halide, such as the chloride, by interaction with a metallic reducing agent, such as magnesium, to form elementary titanium and a by-product reducing metal halide.

Titanium metal is a growing and important article of commerce. Intensive researches are being undertaken to develop improved and cheaper processes for its manufacture. At present, the reduction of a titanium halide with a metal is generally accepted as being the most economically-feasible method for effecting its manufacture. In such process, titanium halide vapors, e. g., TiCl$_4$, are charged into a reaction vessel containing a molten reducing metal which is more electropositive than titanium metal, such as magnesium or an alkali or alkaline earth metal. The titanium compound is reduced by such metallic agent to form titanium metal as a sponge-like mass, and, as a by-product, the corresponding halide salt of the reducing metal employed. Using TiCl$_4$ and Mg as examples, the reaction can be written:

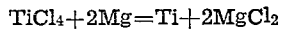

$$TiCl_4+2Mg=Ti+2MgCl_2$$

A serious difficulty in the operation of this process involves the recovery of the titanium sponge reaction product and its separation from the metal halide by-product. The temperature of the reaction is relatively high, being in excess of about 900° C. The reducing metal is in the molten condition while the titanium halide is gaseous, and their interaction is highly exothermic. Consequently, the reaction vessel itself is at a high temperature, usually above the melting point of the by-product halide salt; the titanium sponge, as formed in conjunction with such molten salt, deposits on the hot walls and adheres tightly thereto. Common materials of construction are quickly attacked under such conditions by the corrosive reactants, necessitating frequent replacement of the reaction vessel, or use of a protective liner therefor, both of which methods undesirably increase operating costs. This adherence of the sponge to the vessel surfaces is also disadvantageous in that the mass must be removed by considerable expenditure of time and energy; machining or otherwise chipping away the sponge, or even complete destruction of the reactor or of its protective liner, is generally necessary. Additionally, the recovered titanium is contaminated by particles of the material of construction, thereby disadvantageously reducing quality. These factors have heretofore precluded the possibility of preparing titanium metal by a continuous process and production has been limited to batchwise operation, which is less efficient, more time-consuming, and thus more expensive.

It is among the objects of this invention to overcome the above and other disadvantages inherent in present methods for operating the metal reduction process for producing titanium. A particular object is to minimize or substantially prevent contact of the titanium product with the surfaces of the reaction chamber and to avoid its adherence thereto. Another object is to devise a means for preparing titanium by metal reduction of a titanium halide, wherein the reactor surfaces themselves may be at such low temperature that usual materials of construction are not corroded to a substantial degree. A further object is to provide a continuous process for reduction of a titanium halide and formation of elementary titanium. A specific object is to recover titanium sponge product from the reduction vessel without the necessity of costly and arduous machining or other similar removal methods known to the art.

These and other objects are achieved in this invention which broadly comprises reacting liquid titanium tetrahalide with a reducing metal by floating discrete droplets of said metal while in molten state on the surface of said titanium tetrahalide liquid. These droplets float on the tetrahalide and react therewith to produce floating globules consisting of elementary titanium and by-product reducing metal halide salt. After the exothermic reaction is complete, these product droplets or globules are cooled by the surrounding titanium tetrahalide liquid medium; they solidify and can be easily recovered from the vessel. The product granules, when dry, are free-flowing and can be readily handled and separated into their components by conventional means, whereby pure titanium is recovered.

The accompanying drawing is a flowsheet illustration of one manner in which the invention can be carried out.

In a more specific embodiment of my invention, a discontinuous stream of molten reducing metal is fed dropwise through vaporous titanium tetrahalide and onto the surface of liquid titanium tetrahalide maintained at its boiling point within a reaction vessel. The reducing metal forms liquid drops floating on the surface of the liquid tetrahalide. These floating drops are maintained out of substantial contact with the walls of the reactor and with each other during their interaction with the tetrahalide medium. Prevention of such contact with the walls is preferably effected by setting up currents within the liquid medium, i. e., by circulating said liquid in a mild or gentle motion from the walls of the chamber inwardly toward the center in the form of a vortex. This causes the droplets of reducing metal to accumulate near the center of the liquid rather than at its periphery adjacent the internal walls of the reactor. When the usual interaction of the reducing metal and the titanium tetrahalide takes place, formation of drops or globules of the titanium metal and halide salt by-product occurs, such globules being cooled by the remaining body of liquid. The hot droplets do not actually float in the liquid, but rather are buoyed up on its surface by a film of titanium tetrahalide vapor generated by the intense heat of reaction. As the reaction subsides, these globules cool and solidify, the halide vapor film surrounding them breaks, and the resulting granules become wetted by the tetrahalide liquid and sink downwardly toward the bottom of the vessel. They may then be conventionally removed from the chamber and separated from the liquid medium by any desired means, such as screening or filtering or heating. When dry, they are readily treated to recover the pure titanium therefrom by, say, aqueous leaching or vacuum distillation or other known purification procedures.

According to one preferred embodiment, drops of a molten reducing agent, such as magnesium, are added to and floated on top of a body of liquid titanium tetrachloride within a reactor which is maintained at the boiling point of the tetrachloride. During such addition, mechanical agitation of the liquid is resorted to for purposes of maintaining it under mild movement at its surface, inwardly toward its center, whereby the floating drops will be maintained in constant movement away from the internal walls of the reactor and kept in the center thereof. As these droplets first react with the liquid tetrahalide to produce molten by-product halide and solid titanium metal, and then cool to freeze said molten by-product, this motion of liquid serves to prevent deposition of the material on the reactor walls, and induces formation of small, discrete solid granules, which eventually sink to the bottom of the vessel from which they can be easily removed.

A highly practical adaptation of my invention comprises a continuous process for producing titanium metal, an important advance in commercially obtaining such product. Such adaptation is quite simply effected. Thus, a constant level of the liquid titanium tetrahalide can be maintained in the reactor by adding, as necessary, an additional supply thereof; the reaction vessel itself may be externally cooled so that it is maintained at or below the boiling point of the halide; droplets of molten reducing metal can be continuously introduced to float on the surface of said liquid; the liquid may be maintained in the desired motion from the walls inwardly toward the center by mechanical means; and the product solid granules may be continuously removed from the base of the reactor by suitable mechanical means, such as a simple screw conveyor. The titanium metal component of these granules can then be recovered in the usual and conventional manner.

A peculiar advantage of my novel process resides in the fact that the reaction itself can be utilized to furnish the necessary heat for completion of the reaction. The reactor shell may be at a relatively low temperature, such that titanium sponge product is not encouraged to deposit on its surfaces. For instance, in the case of $TiCl_4$ reduction, the chloride is usually maintained as a boiling liquid with an atmosphere of titanium chloride vapors in the reaction vessel over the chloride liquid. The latter is maintained at the boiling point by the heat of reaction and at a temperature not exceeding about 136° C. The vaporization of $TiCl_4$ consumes the heat released by the reaction, thus maintaining the $TiCl_4$ at or below its boiling point and avoiding equipment temperatures conducive to corrosion. The use of a suitable cooling device, such as a water jacket, can be resorted to, to surround the reactor and minimize $TiCl_4$ vaporization. The purpose of such cooling means is not to decrease the temperature below the boiling point of the chloride, but simply to remove the heat from the area without excessively vaporizing and recondensing large amounts of the chloride reactant. The use of the water jacket is desirable especially where continuous operation is practiced. In any event, the temperature of the chloride reactant should be near or at its boiling point and in excess of about 100° C.

It is necessary in the invention that the reducing metal be added in molten condition, and the particular temperature thereof, during such addition, will vary with and depend upon the agent chosen and its melting point. Its temperature serves to start the volatilization of the titanium tetrahalide, and the heat of the exothermic reaction between the two materials is then sufficient to maintain the temperature of the reacting drops until the reaction is substantially complete. This reducing metal need not be added simply at its melting point but may be superheated to any desired degree short of its boiling point. It is obvious that it is essential to add the reducing metal in such form that discrete droplets will appear on the liquid surface, so that reaction may occur most readily and so that the product will comprise discrete and easily-handled granules. To minimize the time required to add a given amount of reducing metal slowly dropwise, it is often desirable to provide numerous conduits or dropping devices over the surface of the liquid, so that many droplets are discharged thereinto simultaneously. Alternatively, a thin stream of the melt may be introduced, which naturally will break up into droplets. The drops must be of such size and density that they will float on the surface until completely reacted and solidified. If the granules sink before complete reaction or while the by-product halide salt is still liquid, or if they collide materially with one another in such condition, there may be agglomeration thereof and consequent difficulty of removal from the vessel. The particular type of droplet employed is thus dependent upon the reducing agent chosen, the temperatures, and also the type and degree of motion engendered in the liquid tetrahalide; the hot drops instantaneously vaporize the tetrahalide which they contact, so that they are surrounded and supported by a film of this vapor. It is not until they cool and this film breaks, that the product granules become wetted by the remaining liquid tetrahalide medium and sink.

For optimum commercial success, it is critical to my process that these liquid droplets be substantially prevented from entering into contact with the internal surfaces of the reaction vessel, so that there may be a minimum of wall deposition with its consequent problem of removal and cleaning. To avoid such wall contact, a radial flow of the liquid inwardly from the walls toward the center should be maintained during the reaction. This may be achieved, as previously mentioned, by mechanically agitating the system to form a vortex. It may also be realized in continuous operations by introducing the tetrahalide tangentially into the vessel at high velocity, thus developing a swirling motion. A particularly useful method often comprises arranging the inlets for the liquid halide tangentially to the vessel's periphery, and positioning within the vessel a series of baffle plates around and close to its wall surfaces. The liquid halide is injected through the tangential inlets with considerable force, swirls around the inner walls, and flows over the baffles downwardly into the center of the reactor.

The high temperature of the molten reducing metal added to the vessel and the heat of reaction liberated will serve to evaporate a considerable quantity of the remaining liquid titanium tetrahalide. If there were no heat losses by radiation and the like, theoretically there would be evaporated by the heat of reaction about 38 pounds of $TiCl_4$ per pound of Ti produced; similarly large proportions are removed from the system when other titanium tetrahalides are employed. To make the process economically advantageous, it is desirable to provide means to recover this gaseous halide; and it is preferably recondensed and recycled to the process. This is particularly important in a continuous operation. Another economy measure in separating the granular Ti sponge-metal halide salt product from the liquid system is to recover and recycle residual titanium tetrahalide removed therefrom. For instance, instead of screening or filtering the particles, they may be simply heated to violatilize absorbed tetrahalide; and even when filtered or screened, the granules must be dried, whereby residual tetrahalide is also recovered. This recovered material may also be recycled to the reaction vessel after condensation.

The product granules, after recovery and drying, comprise titanium metal and the halide salt of whatever reducing metal was employed. It is necessary to purify the titanium by separating it from such halide salt, and this purification may be effectuated by any of the usual methods. For instance, the granules may be fed into an air-tight chamber, which chamber is then partially evacuated and heated; the by-product halide is thus removed by simple vacuum distillation. Alternatively, aqueous leaching or similar means may be employed.

The following examples are given simply to illustrate my invention but not in any way to limit its scope:

*Example I*

Liquid $TiCl_4$ was charged into a reaction vessel maintained at a temperature of 136° C., and the liquid was agitated mechanically to produce a vortex at the center about 3 inches deep. Commercially-pure magnesium was melted and heated to 800° C., and then added dropwise onto the surface of the liquid $TiCl_4$ in drops of about 5 mm. diameter. The vortical motion caused these droplets to gravitate to the center of the vessel, thus avoiding contact with the walls. As each drop reacted with the $TiCl_4$ surrounding it, a granule of Ti metal and $MgCl_2$ formed, solidified, and sank to the bottom of the chamber. Each drop reacted completely and sank in between 20 and 30 seconds. After the desired quantity of magnesium had been added, the remaining liquid $TiCl_4$ was vaporized off, the vapors being separately collected in a condenser for reuse. Dry granules or pellets comprising $MgCl_2$ and Ti were recovered from the bottom of the reaction vessel; these were free-flowing and easily handled. They were transferred to a vacuum retort and held for one hour at 950° C. under 10 microns Hg pressure, whereby the $MgCl_2$ was distilled off. The solid residue comprised titanium metal of 98.6% purity; for each 100 parts by weight of magnesium reacted, 80 parts by weight of titanium were recovered.

*Example II*

A steel vessel was partially filled with $TiCl_4$ at room temperature. This vessel was water-jacketed for temperature control of the walls, and its base was inclined and fitted with a screw conveyor device. Steam was first added through the jacket to raise the temperature of the $TiCl_4$ to boiling; then the steam was shut off and cooling water circulated during the reaction. Additional $TiCl_4$ was added to the vessel via tangential inlets in the walls, the addition being with such force as to create a swirling motion of the liquid therein. Simultaneously, molten sodium was added dropwise at various points over the surface of the liquid. Reaction occurred between the sodium droplets and the surrounding $TiCl_4$ medium, whereby globules of molten sodium chloride and solid titanium metal were produced; these globules, when reaction was complete, were cooled by the remaining $TiCl_4$ liquid and froze and sank to the base of the vessel. The solid granules were then picked up by the screw conveyor and removed to separate drying and purification equipment. Sufficient $TiCl_4$ was added through the said tangential inlets to maintain the liquid level constant, and molten sodium was added dropwise continuously. The top of the steel reactor was sealed from the atmosphere, and a conduit or vent leading therefrom served to carry away $TiCl_4$ vapors formed by the heat of reaction within the chamber. This conduit led to a separate condensing system, where the vapors were reliquefied and recycled to the tangential inlets of the chamber.

As has been hereinabove mentioned, reducing metals useful herein comprise any which are known for similar reduction operations. Metals which are more electropositive than titanium will serve to reduce titanium halide compounds and generally present commercial methods utilize alkali or alkaline earth metals because of their particular efficiency and comparative availability. Among those especially useful, sodium, potassium, lithium, magnesium, calcium, and the like may be mentioned. As to the titanium halides which may be reduced by such metals, because of the peculiar nature of my process, generally only the tetra compounds are operable. Titanium fluoride under ordinary conditions sublimes directly from the solid to the gaseous state; hence, it is not readily found in liquid phase as required in my process. Similar considerations apply to various sub-halides of titanium, and in addition many are not readily obtainable. Hence, it may be said that I contemplate generally the titanium tetrahalides, and specifically those which have molecular weights greater than about 125, e. g., $TiCl_4$, TiBr₄, or TiI₄. Of these, TiCl₄ is preferred, because it is less expensive and more available in commerce.

In the practice of my improved process, it is to be noted that the reactant metal is dropped as a liquid globule through an atmosphere of vaporous titanium halide. Reaction doubtlessly will begin during the downward passage of the reducing agent through these vapors and will continue after reaching the surface of the liqud. However, the reaction is incomplete before it reaches the liquid, the surface of which may be as close as 2 inches or as much as 5 feet or more from the dropping mechanism which is admitting the molten reducing metal. The rate of reaction of the falling globule with the surrounding gaseous reagent is quite rapid and the heat of reaction at this point is consumed in raising the temperature of the falling material, which is constantly changing from the metal to the metal chloride. The reaction continues as the drop hits the surface of the liquid, and here we have the globule separated from the liquid medium by a gaseous blanket, due to vaporization of the halide. As the rate of reaction diminishes, the particle becomes cooled and solidifies. When the vapors are no longer generated, the particle settles to the bottom and reaches the temperature of the halide liquid through which it falls. At this point it is a solidified agglomeration of titanium metal, reducing metal halide and a possible minor amount of unreacted reducing metal.

It will be seen that my invention has many advantages. For the first time it is possible to maintain the reaction vessel at a relatively low temperature; and this low temperature simplifies the problem of choice of materials of construction. The titanium sponge product is substantially prevented from adherence to the walls of the vessel, so that it does not become contaminated with any of the material of which the wall is made, and it is not necessary to resort to costly physical scraping or machining to remove the wall deposits which occur in prior art methods. Additionally, it is possible to prepare titanium metal by a continuous process which is efficient and relatively simple to operate. Furthermore, the reaction product does not consist of one large sponge-like mass, but rather of small, free-flowing, easily-handled granules.

I claim as my invention:

1. A process for the preparation of titanium metal through reduction of a titanium tetrahalide with a reducing metal which comprises floating discrete droplets of a molten reducing metal out of contact with the internal surfaces of a reaction vessel and on the surface of a body of liquid titanium tetrahalide which is maintained within said vessel and at substantially the boiling point temperature of said tetrahalide, during the resulting reduction reaction applying a circulatory motion to said liquid body, recovering the granules of reducing metal halide containing elementary titanium thereby formed and separating said titanium from said reducing metal halide.

2. A process for the preparation of titanium metal which comprises charging a liquid titanium tetrahalide reactant into a reaction vessel to form therein a liquid body of said reactant, maintaining the latter at substantially its boiling point, floating on the surface of said liquid drops of a molten reducing metal for reaction with the vapor evolved from said reactant, maintaining said floating drops out of substantial contact with the internal walls of said reaction vessel and with each other by applying a circulatory motion to said liquid body, recovering the reducing metal halide-titanium metal granules thereby formed, and separating therefrom the titanium metal component.

3. A process for the preparation of titanium metal which comprises effecting reaction between a reducing metal and a titanium tetrahalide having a molecular weight greater than 125 by dropping a discontinuous stream of molten reducing metal into a reaction zone through the vaporous titanium tetrahalide and onto a liquid body of said titanium tetrahalide maintained at its boiling point within said zone, employing a rate of addition in such step that the reducing metal is buoyed up on the surface of said liquid by the gaseous tetrahalide generated by the heat of reaction and until the reaction subsides, during said reaction applying a circulatory motion to said liquid to maintain said reducing metal out of contact with the internal walls of said reaction zone, and thereafter recovering the solidified reaction product from the unreacted titanium tetrahalide and separating its titanium metal content from the reducing metal halide reaction product formed in the process.

4. A continuous process for the preparation of titanium metal which comprises maintaining a constant body of liquid titanium tetrahalide having a molceular weight greater than 125 in a reaction zone the temperature of which is maintained at the boiling point of such halide, continuously introducing droplets of a molten reducing metal onto the surface of said body of liquid, maintaining said droplets out of substantial contact with the internal walls of said zone by circulating the liquid body of tetrahalide in the form of a vortex upon reaction of said reducing metal with said tetrahalide allowing the resulting titanium metal-reducing metal halide golbules to cool and solidify and submerge into the tetrahalide liquid, and continuously removing the solidified granules from the bottom of said zone and separating therefrom the titanium metal component.

5. A process for the preparation of titanium metal which comprises floating discrete droplets of a molten reducing metal on the surface of a body of liquid titanium tetrachloride maintained at its boiling point within a reaction vessel, maintaining said floating droplets out of contact with the internal walls of said vessel by circulating said liquid in mild motion from the internal walls of said vessel inwardly toward its center, interacting said droplets with the vapors evolved from said tetrachloride medium, recovering the reducing metal chloride-titanium metal granules thereby formed, and separating them from the titanium metal reaction product.

6. A process for the preparation of titanium metal which comprises floating discrete droplets of molten magnesium for reaction on the surface of a body of liquid titanium tetrachloride maintained at its boiling point within a reaction zone, maintaining the droplets upon contact with said liquid out of contact with the walls of said zone by circulating said liquid in the form of a mild vortex, recovering the magnesium chloride-titanium metal granules which form in the resulting reaction, and separating and recovering the titanium metal component.

7. A process for the preparation of titanium metal which comprises reacting magnesium with titanium tetrachloride within a closed reaction vessel by dropping a discontinuous stream of molten magnesium through vaporous titanium tetrachloride onto the surface of a body of liquid titanium tetrachloride maintained at its boiling point and under circulatory motion to form a vortex in a reaction zone in said vessel, employing such rate of addition that the magnesium is buoyed up on the surface of said liquid by the gaseous tetrachloride generated by the heat of reaction, upon completion of the resulting reaction allowing the reaction product to sink below the surface of said liquid, and thereafter recovering the solidified reaction product in the form of free-flowing granules from the unreacted titanium tetrachloride liquid and separating its titanium metal values from its magnesium chloride content.

8. A continuous process for the preparation of titanium metal which comprises maintaining a constant body of liquid titanium tetrachloride in a cooled reaction vessel which liquid body is maintained at the boiling point of said chloride, continuously introducing molten magnesium in droplet form onto the surface of said liquid, minimizing contact of said droplets with the internal walls of said vessel by maintaining said liquid tetrachloride body in constant motion within said vessel and flowing from said walls in a direction inwardly toward the center of said vessel, allowing the resulting titanium metal-magnesium chloride reaction product globules to cool and solidify within the tetrachloride liquid body, thereafter continuously removing such solidified granules from said vessel and separating and recovering therefrom the titanium metal component thereof.

9. A method for preparing titanium metal which comprises forming a body of liquid $TiCl_4$ within a portion of a closed reaction vessel wherein said liquid body is maintained at a temperature of about 136° C., mechanically agitating said liquid body within said vessel to form a vortex on the surface of said body, during said agitation introducing melted magnesium in droplet form into said reaction zone for passage through the $TiCl_4$ vapors evolved above said liquid body and onto the surface of the latter, upon completing the reaction between said magnesium and $TiCl_4$ vapors removing said liquid body of $TiCl_4$ from said vessel, recovering the granules of titanium and magnesium chloride reaction product formed therein, and then separating and recovering the titanium metal from said reaction product.

CHARLES H. WINTER, Jr.

REFERENCES CITED

The following references are of record in the file of this patent:

UNITED STATES PATENTS

| Number | Name | Date |
|---|---|---|
| 2,076,067 | Copper | Apr. 6, 1937 |
| 2,121,084 | Kruh | June 21, 1938 |
| 2,148,345 | Freudenberg | Feb. 21, 1939 |
| 2,171,439 | Von Zeppelin | Aug. 29, 1939 |
| 2,205,854 | Kroll | June 25, 1940 |
| 2,486,475 | Kawecki | Nov. 1, 1949 |
| 2,556,763 | Maddex | June 12, 1951 |
| 2,564,337 | Maddex | Aug. 14, 1951 |

OTHER REFERENCES

Metal Industry, May 16, 1947, pp. 363–364.

Bureau of Mines, R. I. 4519, August 1949, on "Production of Ductile Titanium at Boulder City, Nev." Figure 2 (between pp. 4 and 5) and pp. 5–15.